Dec. 15, 1936.  E. D. MACK  2,064,553
BRAKING MECHANISM
Filed Oct. 28, 1932
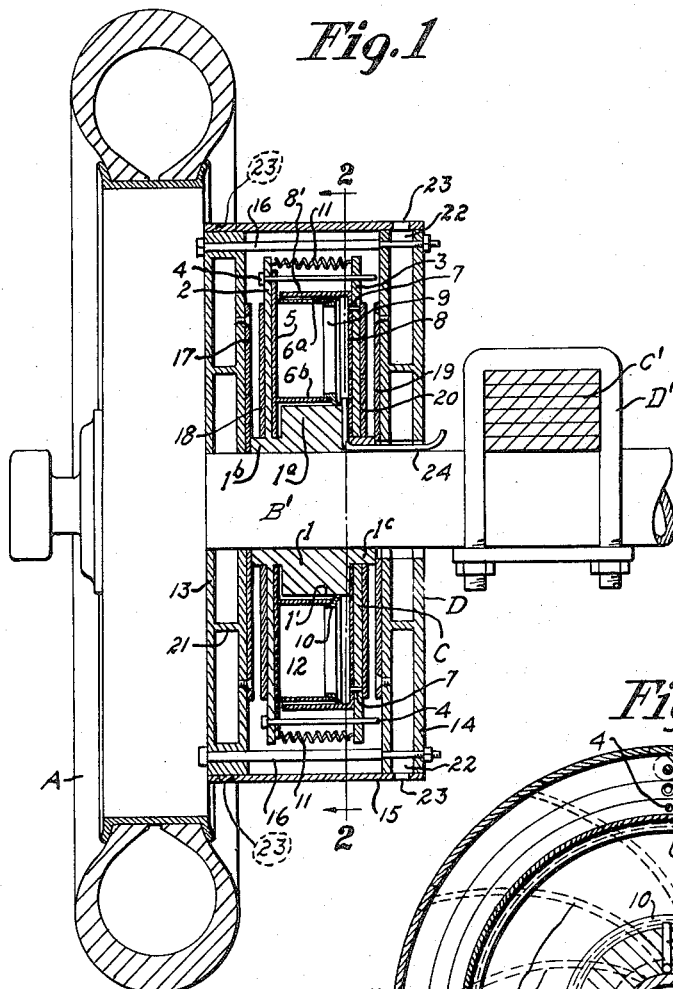
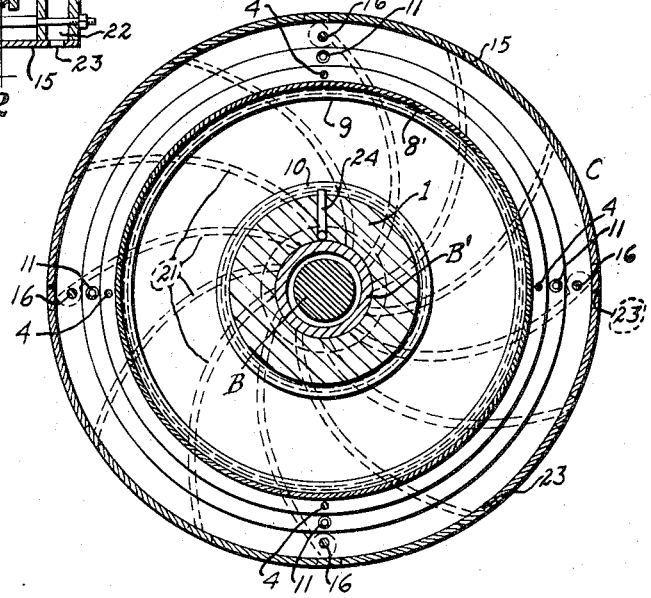
INVENTOR
E. D. MACK
By J. H. Cook
ATTORNEY Patented Dec. 15, 1936

2,064,553

UNITED STATES PATENT OFFICE 2,064,553

BRAKING MECHANISM

Edward D. Mack, St. Louis, Mo.

Application October 28, 1932, Serial No. 639,951

2 Claims. (Cl. 188—72)

This invention relates generally to braking mechanisms, and has for its predominant object the provision of an improved braking mechanism which is so constructed and is capable of such operation that the entire areas of the braking elements thereof are rendered effective for braking action when the braking mechanism is operated.

In the operation of braking mechanisms of the types which include pivoted contracting or expanding elements movable into cooperative engagement with brake drums, only certain portions of said contracting or expanding elements are rendered effective to the maximum degree for braking action when the braking mechanisms are actuated. In other words, in the operation of braking mechanisms having such pivoted elements the maximum braking action is realized at the ends of the elements remote from the pivots and the braking action obtained gradually diminishes as the pivots of the elements are approached.

The predominant object of this invention is to eliminate the disadvantages of the braking mechanisms formerly employed by providing an improved mechanism having braking elements which are effective for the maximum braking action throughout the entire braking areas thereof. In this manner an improved braking mechanism is provided which is positive in its action and efficient and dependable in use.

Fig. 1 is a vertical section illustrating my improved braking mechanism associated with a vehicle wheel.

Fig. 2 is a cross-section on line 2—2 of Fig. 1.

In the drawing, wherein is shown for the purpose of illustration, merely, one embodiment of the invention, A designates a ground wheel of a vehicle and B designates an axle on which said wheel is mounted for rotation, said axle having an axle housing B′ associated therewith. Associated with the ground wheel referred to is my improved braking mechanism, which is designated generally in the drawing by the reference character C. In Fig. 1 the axle housing B′ has associated with it a suitable vehicle spring C′ of the leaf type, which is connected to the axle housing by the fastening element D′.

The braking elements C includes an element 1 which is splined or otherwise secured to the axle housing B′ for slidable movement longitudinally thereof, said element 1 being so shaped as to have an inner portion 1ª of increased thickness and sleeve portions 1ᵇ and 1ᶜ at opposite sides of said inner portion 1ª which are of relatively less thickness. Secured to or formed integral with the sleeve portion 1ᵇ of the element 1 is a vertically disposed plate 2 which preferably, though not necessarily, is circular in shape. Supported by the sleeve portion 1ᶜ of the element 1 for sliding movement longitudinally thereof is a similar plate 3, said plate 3 being guided in its movement by the sleeve portion 1ᶜ and by a plurality of spaced pins 4 which extend through said plate 3 and through the plate 2, as shown in Fig. 1.

Secured to the plate 2 is an inner plate portion 5 of annular shape from which a pair of concentric, horizontally disposed wall portions 6ª and 6ᵇ are extended, the space between said concentric wall portions 6ª and 6ᵇ constituting an annular cavity, as shown in Fig. 1. Secured to the plate 3 through the instrumentality of the pins 7 is a similar plate 8, from the outer edge of which an annular, horizontally disposed wall 8′ is extended. The annular wall 8′ of the plate 8 and the annular wall 6ª of the plate 5 are arranged in overlapping relation, as shown in Fig. 1, and a packing element 9 of the cup type is fixed to the wall 6ª and contacts with the wall 8′ so as to prevent passage of fluid between said walls. Also, the wall 6ᵇ of the plate 5 is arranged parallel with and in close proximity to the annular face 1′ of the element 1, and this wall 6ᵇ has fixed thereto a packing element 10 of the cup type, which contacts with said face 1′ and prevents passage of fluid between the wall 6ᵇ and the face 1′. The plates 2 and 3 are connected together by a plurality of coil springs 11 which tend to move said plates toward each other. The arrangement of the plates 2 and 3 together with the relation of the plates 5 and 8 and the associated and cooperating annular walls 6ª, 6ᵇ, and 8′, provide an expansible and contractible fluid chamber 12, which constitutes a highly important feature of the present invention.

Secured to the ground wheel A and rotatable therewith is the housing D of the improved braking mechanism. The housing D comprises an inner housing element 13, which is secured directly to the wheel A in any suitable manner, and a similar outer housing element 14, which is located outwardly of the plate 3 already referred to herein. The inner and outer housing elements 13 and 14 have associated therewith and fixed thereto an annular wall 15, and said inner and outer elements and said annular wall rotate as a unit with the wheel A because of the bolts 16 which secure said inner and outer elements together.

Fixed to adjacent faces of the housing element 13 and the plate 2 are coacting brake facings 17 and 18 which are produced from suitable material, and secured to the adjacent faces of the housing element 14 and the plate 3 are similar coacting brake facings 19 and 20. The brake facings 17, 18, 19, and 20 are of the proper shape, and as will presently appear herein, the associated pairs thereof are moved into cooperative engagement with respect to each other when the brake mechanism is actuated to arrest movement of the ground wheel A. The housing elements 13 and 14 are each of hollow formation, as shown in Fig. 1, and formed within each of said elements is a plurality of air-contacting fins 21, as shown in Fig. 1, which are shaped and arranged in the general manner illustrated in said view. At the circumferential edges of the housing elements 13 and 14 apertures 22 are provided which register with similar apertures 23 formed through the annular wall 15.

Extended into the fluid chamber 12 as shown in Fig. 1 is a fluid conductor 24, which constitutes a part of the brake-actuating mechanism ordinarily found on motor vehicles. The conductor 24 serves as a conduit for brake-actuating fluid, and movement of fluid through this conductor is controlled by the usual foot pedal or other brake-actuating means. The conductor 24 preferably extends parallel with the axle B and passes through openings formed in the housing element 14 and the element 1, said opening formed in the housing element being of annular formation so as to permit said element to rotate with respect to the stationary conductor.

In the use of my improved braking mechanism the brake housing D rotates with the wheel A, and air will be drawn into the interiors of the housing elements 13 and 14 by the fins 21, whereby said elements will be cooled. When in the operation of a motor vehicle or other apparatus equipped with the improved braking mechanism it is desired to actuate said braking mechanism, the brake-actuating mechanism of the braking mechanism is operated with the result that fluid will be introduced into the fluid chamber 12. Such introduction of fluid into the fluid chamber will expand same, thus forcing the brake facings 18 and 20 associated with the plates 2 and 3 into engagement with the brake facings 17 and 19 associated with the housing elements 13 and 14. The housing elements 13 and 14 rotate with the ground wheel A while the plates 2 and 3 are held nonrotatable on the axle housing, hence contact between the brake facings will arrest movement of the ground wheel. When the fluid chamber is expanded as described, the plates 2 and 3 together with the parts associated therewith move away from each other, the element 1 of which the plate 2 forms a part sliding longitudinally of the axle housing, and the plate 3 moving longitudinally of the portion 1c of said element 1. This movement of the plates extends the coil springs 11, and when the fluid pressure within the fluid chamber 12 is relieved the coil springs will cause the plates 2 and 3 to move toward each other, whereby the fluid chamber will contract and the brake facings will be drawn out of contact with each other.

It is plain, therefore, that in the operation of my improved braking mechanism the entire areas of the braking elements are utilized in obtaining the maximum braking action, hence a braking mechanism is provided which is more efficient in use than were the braking mechanisms commonly used heretofore.

While I have described my improved braking mechanism in connection with a ground wheel of a vehicle, it is obvious, of course, that same may be used in any situation where a braking mechanism is desired.

I claim:

1. A braking mechanism comprising a pair of members movable with an element whose movement it is desired to control through the operation of said braking mechanism, said members being hollow and having openings leading into the interiors thereof to facilitate cooling of said members, spaced members movable into contact with said pair of members, said pair of members and said spaced members being so shaped and arranged that substantially the entire areas thereof are adapted to contact when said members are moved together, and means including an expansible and contractible fluid chamber for moving said spaced members into contact with said pair of members, said fluid chamber comprising a pair of oppositely disposed, rigid chamber portions and a base element which is supported for sliding movement and with respect to which one of said rigid chamber portions moves, said fluid chamber being interposed between said spaced members and said spaced members being movable with portions of said fluid chamber.

2. A braking mechanism comprising a pair of members movable with an element whose movement it is desired to control through the operation of said braking mechanism, said members being hollow and having openings leading into the interiors thereof to facilitate cooling of said members, spaced members movable into contact with said pair of members, said pair of members and said spaced members being so shaped and arranged that substantially the entire areas thereof are adapted to contact when said members are moved together, means including an expansible and contractible fluid chamber comprised of a plurality of rigid chamber portions arranged for relative movement for moving said spaced members into contact with said pair of members, said fluid chamber including a base element which is supported for sliding movement and with respect to which one of said rigid chamber portions moves, said fluid chamber being interposed between said spaced members and said spaced members being movable with portions of said fluid chamber, and air-contacting elements within said pair of hollow elements for assisting in the cooling thereof.

EDWARD D. MACK.